Figure 1:
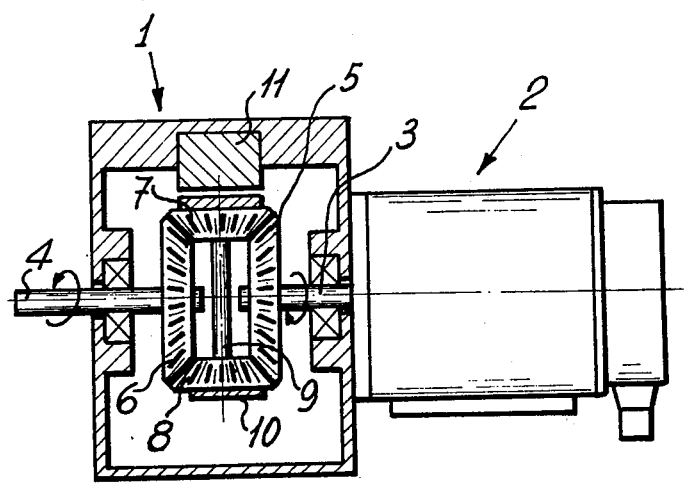

United States Patent [19]

Franzolini

[11] 4,074,579
[45] Feb. 21, 1978

[54] DEVICE FOR DETECTING DIFFERENCES IN ANGULAR POSITIONS OF TWO SHAFTS ROTATING IN OPPOSITE DIRECTIONS

[75] Inventor: Luciano Franzolini, Milan, Italy

[73] Assignee: EL.GE. Apparecchiature Elettroniche Industriali S.p.A., Varese, Italy

[21] Appl. No.: 627,658

[22] Filed: Oct. 31, 1975

[30] Foreign Application Priority Data

Nov. 8, 1974 Italy .................. 29228/74

[51] Int. Cl.² .............................................. G01P 3/08
[52] U.S. Cl. ...................................................... 73/507
[58] Field of Search ..................... 73/507, 518, 136 A; 324/161; 60/702, 703; 361/243, 244

[56] References Cited
U.S. PATENT DOCUMENTS

| 1,709,673 | 4/1929 | Kintzing | 73/507 X |
| 1,749,569 | 3/1930 | Florez | 73/507 X |
| 2,779,582 | 1/1957 | Hopper et al. | 73/507 X |
| 2,935,311 | 5/1960 | Kabelitz | 73/507 X |
| 3,139,006 | 6/1964 | Budzich | 73/507 X |
| 3,683,685 | 8/1972 | Viegelahn | 73/136 A |
| 3,769,533 | 10/1973 | Pauwels | 310/155 |

Primary Examiner—James J. Gill
Attorney, Agent, or Firm—Kurt Kelman

[57] ABSTRACT

A device for detecting the difference in the rotary speeds of two rotating shafts comprises a bearing for coaxially mounting the shafts for rotation in opposite directions, a low power precision stepping motor imparting a programmed speed of rotation to one of the shafts, a gearing interconnecting the shafts and displaceable in response to a change in the relative angular position of the two rotation shafts, and a sensor detecting displacement of the gearing in response to the change.

2 Claims, 2 Drawing Figures

U.S. Patent

Feb. 21, 1978

4,074,579

DEVICE FOR DETECTING DIFFERENCES IN ANGULAR POSITIONS OF TWO SHAFTS ROTATING IN OPPOSITE DIRECTIONS

This invention relates to a device for detecting with great accuracy, the difference in the angular position of a rotating shaft relative to another shaft, rotating as well in the same or opposite direction, the latter shaft being associated with programming means in order to synchronize the rotation of one shaft relative to the other, for programmed movement control of operating machines or the like. It is known to associate devices with various kinds of machines, in order to control the movement or positioning of the operating means according to a specific operation program. Such devices generally use stepping motors, adapted to produce substantially uniform movements but nevertheless affected by serious deficiencies, as far as the torque supplied and the speed of rotation under maximum torque are concerned. In order to avoid these drawbacks, control systems of a mixed type have been proposed.

In one of these systems, the stepping motor was connected to a precision screw which moved a nosepiece tracked in turn by a hydraulically, electrically or similarly operated follower means, adapted to monitor the driving power.

According to another known type, the stepping motor is mechanically linked to a hydraulic motor adapted to amplify the mechanical signals thereof for subsequent use.

However, these known devices have the disadvantage of requiring expensive and delicate electronic parts and, at the same time, complicated hydraulic systems.

By means of the device according to this invention, it is possible to combine a high precision, low power stepping motor with a direct current motor of any size, adapted to supply the necessary drive for proposed operations.

Therefore, it is possible to utilise the advantageous features of the stepping motor, combining them with those of power and speed of the direct current control.

According to this invention, there is provided a device having a pair of preferably coaxial shafts, a first one being operated by a small size stepping motor adapted to impart to the one shaft a high precision angular movement according to a predetermined program, while the other shaft is driven by the movement of the operating means, in the same or a direction opposite to the former, the connection between the shafts being adapted to allow detecting the relative angular position thereof. A sensor is provided in a fixed location in order to detect and measure the relative position, the sensor being in turn associated to any known control means adapted to control the driving motor until a synchronous interlocking between the movement of the drive shaft and that of the stepping motor shaft is obtained.

More particularly, the device according to this invention uses a stepping motor having the necessary accuracy for running the operating machine, without requiring the same to supply any power, or else just the minimum power needed for moving the members associated with the shafts of the detecting device. The members detect a relative angular motion between both shafts of the device, or a linear displacement and, in the latter case, means are associated with the counter-rotating shafts to transform the angular motion into linear motion. In both cases, said means perform mechanically, or by any other suitable way, the algebraic sum of two pieces of information, and, in this particular case, between the rotary motion of the output shaft of the stepping motor, and the output from the operating machine, which algebraic sum is then transformed either into angular or in linear motion. The mechanically operated means for performing an algebraic sum may comprise, for example, a pair of coaxial opposed bevel gear members, integral with both shafts, there being provided between the bevel gear members one or more planet gears freely rotatable around their own axis and around the axis belonging to both said shafts, the axis of the planet gears being either fixed or being allowed to perform an angular movement whose amplitude is larger or smaller in accordance with the difference of speed between the two shafts being zero, or having more or less substantial values.

A further example of mechanical means adapted to detect the algebraic sum of pieces of information concerning opposite rotation, which sum may be transformed in a linear movement, may comprise a partially engaged screw-and-nut assembly, where the screw is integral with a shaft while the nut is mounted on a coaxial shaft for rotation therewith but linearly slidable with respect thereto. The nut will either remain steady or linearly move, depending on whether the rotary motions are equal or different.

Moreover, the device according to this invention includes a sensor means installed in a fixed location and adapted to detect and/or to measure either the position or the variation of the position reached by said means, which perform the algebraic sum of the pieces of information, the sensor means being in turn associated to program control means, for the predetermined program and/or controlling the power supply means.

The sensor may be of any known type, for example magnetic, capacitive, electronic, photoelectric, fluid operated or the like, and may be suitably located according to the requirements of the program.

Figure 2:
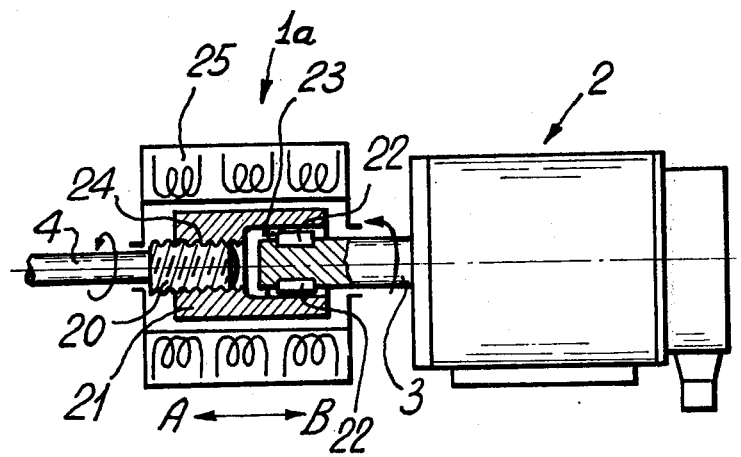

These and other features will be apparent from the following detailed description of the device according to this invention, shown in the annexed drawing, in which:

FIG. 1 diagrammatically shows a device according to this invention, having means to detect angular motion, and FIG. 2 shows the device provided with means for detecting a linear motion.

Referring now to FIG. 1, the device according to this invention is generally indicated by 1 and it is associated with a stepping motor of a known suitable type shown at 2, having a shaft 3 which performs a motion predetermined on the basis of a program.

Coaxial shaft 4 is directly operated by, or linked to, the mechanism controlling the operations to be performed according to the program, for example by a screw controlling the displacement of the tool holder slide of a lathe, by the rotating shaft of a tool, of an apparatus or the like shaft 4 is substantially integral for rotation with the operating part of the machine which is to embody the program governing the motor 2.

An essential condition, according to this invention, is the fact that the two shafts 3 and 4 rotate in an opposite direction. Each shaft 3 and 4 is respectively connected to a bevelled pinion gear 5-6, the pinions meshing in turn with the planet gears 7-8 rotatable on common axle 9 which is integral with ring gear 10. In front of gear 10 there is positioned a sensor 11, for example a magnetic detector, a photoelectric cell, a differential transformer, a magnetic resistor, cells based on the Hall effect, an electronic means, a fluid means or the like, which is in a fixed location, or anyway in a location being predetermined or adjustable, according to the necessity, or the type of detector. The device operates as follows:

The rotation of stepping motor 2 is controlled by known means, according to any program which must be followed by the operating machine having the device associated therewith. Therefore, the motor keeps the shaft 3 rotating in a predetermined direction, at the desired speed.

The driving motor for the operating machine, for example a direct current motor, gets a suitable power supply in order to make the machine operate at a predetermined speed, which must be equal to that imposed by the program on the stepping motor 2.

From the said pair of the operating machine controlled by the driving motor it is possible to obtain the rotary motion which may be transmitted (either directly, or by intermediate mechanical linkage) to shaft 4 so that shaft 4 rotates in a direction opposite to that of coaxial shaft 3.

The two bevel gears 5 and 6 will rotate, together with shafts 3 and 4, and the planet gear members 7-8 will rotate around their common axle 9.

As a consequence, if the angular speed of the two pinions 5 and 6 is equal while they rotate in an opposite direction, the planet gear members 7-8 will rotate around their axis but they and gear 10 will remain steady in the position they assumed relative to zero. That means that the speed of the operating part of the machine is equal to that imposed by the program and since the sensor means 11 doesn't detect any displacement of gear 10, it supplies no displacement reference corresponding gear to the said position.

If conversely the angular speed of the two shaft 3 and 4 is even slightly different, planet gear members 7-8 together with gear 10 will move angularly, in one direction or the opposite relative to the zero position, so that the sensor 11, upon detecting said movement, will be able to bring into operation the means provided for controlling the drive motor until the zero position is restored.

Referring now to FIG. 2, there is shown a device where the means provided for the mechanical performing of the algebraic sum of the motions, detect a zero position or a variation position, with linear motions rather than angular motions.

In this embodiment, device 1a also is associated with a stepping motor 2, with an output shaft 3 having a speed dependent on the program controlling motor 2, and a shaft 4 rotating in a direction which is the same as that of shaft 3.

The end of shaft 4 has an integral screw thread 20, while the end of shaft 3 is connected to a sleeve 21 co-rotationally mounted thereon, for example by tongues 22 slidable inside grooves 23, and provided with a screw threaded nut 24, meshing with thread 20 on shaft 4. The two threaded parts are in partial engagement with each other. Surrounding sleeve 21 there is provided a sensor 25, for example a differential transformer, an optical magnetic means, an electronic means or the like, of any known type, adapted to detect any axial displacement of sleeve 21.

Compared to the device described with reference to FIG. 1, the operation of the device of FIG. 2 shows a single difference, in the fact that, when shafts 3 and 4 rotate at the same speed, threaded sleeve 21, while rotating as a part of shaft 3, doesn't perform any axial movement, the rotary speed of nut 24 being equal to that of screw 20. Conversely, if the rotating speeds are different, sleeve 21 will be displaced linearly according to arrow A or B, and such displacement is detected by sensor 25 which in its turn provides for the performance of the necessary operations.

What is claimed is:

1. A device for detecting the difference in the rotary speeds of two rotating shafts, comprising means for coaxially mounting the two shafts for rotation in the same direction, a low power precision stepping motor for imparting a programmed speed of rotation to one of the shafts, means interconnecting the shafts and displaceable in response to a change in the relative angular position of the two rotating shafts, the interconnecting means comprising a bush of magnetic material and acting as the core of a differential transformer freely axially movably mounted on the one shaft and corotational therewith, the bush having an internally threaded portion, and an externally threaded screw portion on the other shaft, the externally threaded screw portion and the internally threaded push portion meshing to form an axially displaceable interconnection, and an immobile sensor fixedly mounted adjacent the interconnecting means, the sensor being mechanically disconnected from the interconnecting means and arranged to detect displacement of the interconnecting means in response to the change in the relative angular position of the rotating shafts.

2. The detecting device of claim 1, wherein the sensor is mounted adjacent the axially movable bush for detecting the axial displacement thereof.

* * * * *